May 28, 1968 J. T. BARTON 3,384,940
PIPE LINING TROWEL APPARATUS
Filed Sept. 30, 1965
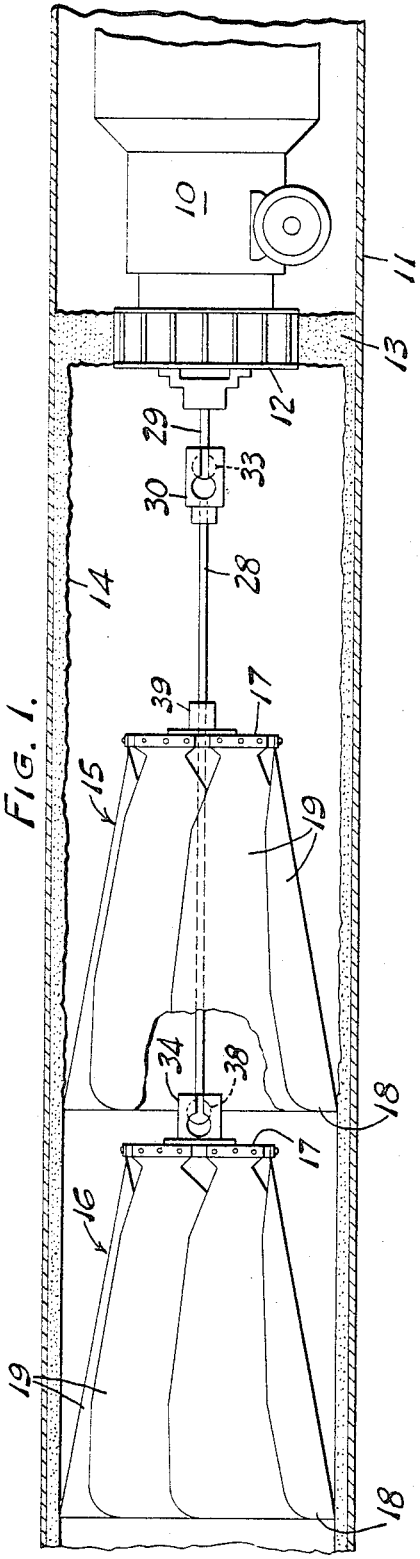
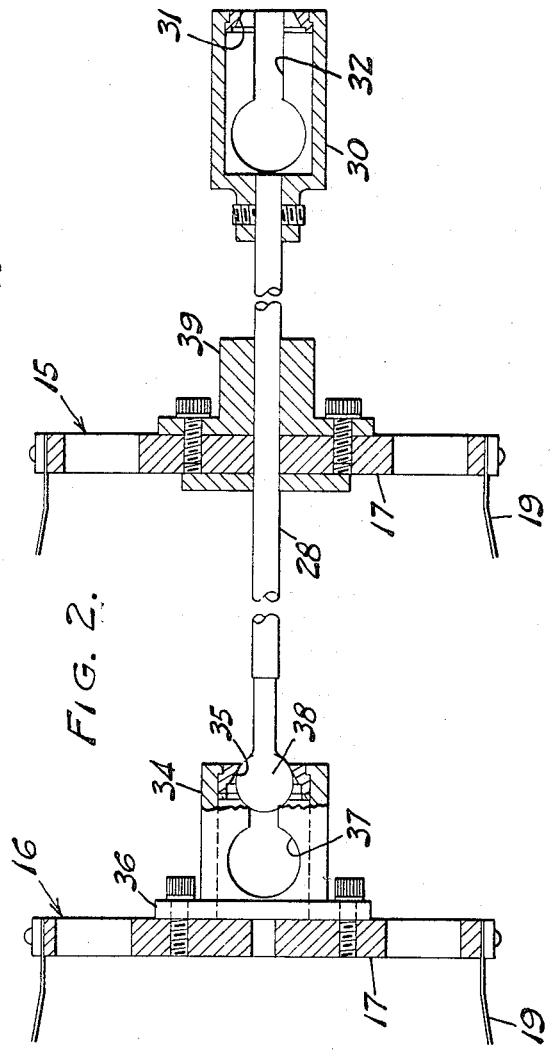
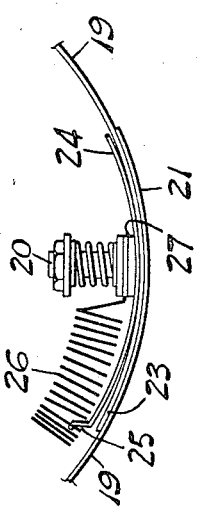
INVENTOR.
JOHN T. BARTON
BY
Christel & Bean
ATTORNEYS

United States Patent Office 3,384,940
Patented May 28, 1968

3,384,940
PIPE LINING TROWEL APPARATUS
John T. Barton, Montour Falls, N.Y., assignor to Perkins Pipe Linings, Inc., Grand Islands, N.Y.
Filed Sept. 30, 1965, Ser. No. 491,721
6 Claims. (Cl. 25—38)

ABSTRACT OF THE DISCLOSURE

Apparatus for troweling a previously applied layer of cement mortar at the interior of a pipe, the apparatus consisting of two axially spaced frusto-conical trowels and a connecting rod which is fixed axially medially of its ends to the leading end of the first trowel and is pivoted at is forward end to traction means such as a mortar applying machine and is pivoted at its rear end to the leading end of the second trowel. The latter pivot is located substantially in the transverse plane formed by the large trailing end of the first trowel.

---

This invention relates generally to apparatus for applying a protective coating of mortar or similar material in plastic condition to the interior walls of pipes, conduits and the like, and more particularly to troweling apparatus for smoothing the coating after it has been applied in a manner which will insure a smooth uniform coating at all peripheral interior wall portions of the pipes.

Apparatus for applying a lining of mortar or similar plastic material to the interior of pipe lines in place in the ground is well known in the art and generally comprises a machine which travels on rollers through the pipe while distributing a coating of lining material to the interior of the pipe by centrifugal action. Likewise, devices for troweling the rough coated surface after the coating has been applied to the interior walls of the pipe are known, an example of which is disclosed in Letters Patent No. 3,188,710, dated June 15, 1965.

A type of troweling device which is widely used is known in the art as a "drag" trowel and consists of a conical trowel adapted to be drawn through an underground pipe behind the coating applying machine, thus troweling the newly applied mortar coating into a smooth internal cylindrical surface. Trowels of this type are, in general, frusto-conically shaped with their larger end resiliently expandable and contractable in diameter, such end trailing the smaller diameter end which is drawn by the coating or mortar-applying machine through the pipe. The resiliency of the large end of the trowel accommodates the trowel to changing local conditions within the pipe, including variations in the thickness of the applied coating, temporary distortions in the nature of non-circular cross-sections, and to pass over projections on the interior surface of the pipe. Expanding springs or the like are used to provide resiliency to the larger diameter end of the trowel to cause the exterior thereof to bear against the interior surface applied mortar of the pipe and accommodate the trowel to pipe distortions. Also, the resilience of such large end of the trowel produces a yieldable troweling pressure against the mortar.

Since trowels of the above type are drawn through a pipe under conditions where the operation of the trowel cannot be observed and wherein necessary adjustments cannot be readily made, the necessity of providing a troweling device which travels accurately through the pipe and performs the designed functions efficiently is very apparent.

Under certain conditions, a problem occurs when the coating machine draws the trowel through the pipe, in that, the angularity of the larger diameter mortar engaging portion of the conically shaped trowel changes with respect to the interior cylindrical surface of the pipe at different circumferential portions of the surface. In other words, the axis of the frusto-conical trowel body diverges from the axis of the pipe to be lined, producing non-uniform angles between the external sides of the cone and the mortar surface at the peripheral mortar-engaging portions thereof.

This angular divergence is caused by a lateral wandering of the point of connection between the pipe lining machine and the trowel. As the coating machine wanders from side to side or up the wall of a pipe or becomes canted with respect to the longitudinal axis of the pipe, the point of connection between the trowel and the machine follows such motion, producing a non-uniform peripheral angle of attack of the troweling surfaces with respect to the mortar at the interior surface of the pipe. This lateral divergence varies the angle of attack of the troweling surface with respect to the interior wall of the pipe at various portions about the periphery thereof, resulting in an inefficiently and ineffectively troweled surface.

This results in improper troweling and variations in surface texture of the applied coating and the resultant surface is troweled at different peripheral positions of the interior pipe surface. An angle of attack of the trowel which is too great relative to the interior surface of the pipe results in an unsatisfactory troweled surface having rough edges and a scraped surface. An angle of attack which is too small results in an unsatisfactory troweled surface inasmuch as reduced troweling pressure is applied, the troweling pressure being distributed over an abnormally large area of mortar. This produces a result wherein only the high spots are troweled and pitting of the surface and voids therein are objectionably present. Both of these improper troweling actions reduce the flow efficiency in the pipes to a marked degree, due to turbulence and skin-friction. Abnormal wear of the lining may also result. The combination of such unsatisfactory troweled surfaces at different peripheral portions of the same cross section of the pipe compounds the problem and may lead to a very high and undesirable turbulence and rotary flow, reducing the efficiency of fluid flow and in general shortening the wear life of the pipe.

The arrangement and construction of the present invention is such as to provide a trowel arrangement connected to and drawn behind a pipe lining machine which will provide a uniform smoothly troweled surface regardless of irregular movements of the pipe lining machine through the pipe. The trowel arrangement of the present invention provides a means to maintain a constant predetermined angle of attack of the trowel relative to the interior surface of the pipe at all circumferential portions thereof as the troweling apparatus is drawn through the pipe during the pipe lining operation. The means employed are of a simple low-cost construction and requires no external manipulation once the troweling apparatus is placed in an unlined pipe. The troweling surfaces will maintain a constant angle of attack with respect to the mortar and thus produce a constant and uniformly troweled surface automatically and without regard to the relative position of the pipe lining machine within the pipe.

Further, the means employed in the present invention to maintain the final trowel device at a constant predetermined angle of attack with respect to the mortar surface is in itself a trowel and provides a preliminary troweling of the coated surface prior to the finishing of the interior surface of the pipe by the final trowel device. In other words, the trowel apparatus of the present invention not only maintains a trowel at a uniform angle of attack relative to the interior mortar pipe surface but also provides a preliminary and a final troweling of the lining material, thus providing a smoother and more uniform troweled surface.

A single specific embodiment of the principles of the present invention is illustrated in the accompanying drawings and described in detail in the following specification. However, it is to be understood that such embodiment is by way of example only and that various mechanical modifications may be introduced without departing from the spirit of the invention, the scope of which is limited only as defined in the appended claims.

In the drawings:

FIG. 1 is a side elevational view, partly in cross section, of a pipe lining machine drawing the trowel apparatus of the present invention through a pipe;

FIG. 2 is a fragmentary cross-sectional view of a portion of the structure of FIG. 1 showing the centering rod and its connection with the small ends of the frusto-conical trowels; and FIG. 3 is a fragmentary end elevational view of one of the conical trowel elements viewed from the large or trailing end thereof, showing expansion means permitting the large end to expand and contract.

Like characters of reference denote like parts throughout the several figures of the drawings and, referring particularly to FIG. 1, the numeral 10 designates a pipe lining machine which may be of the type illustrated and described in the United States Letters Patent No. 2,758,352, the machine 10 being adapted to be drawn through a subterranean pipe 11 by a remote winch and a cable means or the like, not shown, the movement of the machine 10 being to the right as viewed in FIG. 1 during the pipe lining operation thereof.

Mortar or other material in a plastic condition is fed to machine 10 by a flexible conduit, not shown, and is applied to the interior surface of the pipe 11 by a rotary distributor head 12 which discharges the mortar or the like centrifugally as indicated at 13, thereby applying a rough coating 14 of mortar or the like to the interior of the pipe. The thickness of the coating is regulated by the discharge from distributor head 12 and the rate of movement of the machine 10 through the pipe.

The troweling apparatus of the present invention is drawn through the pipe 11 by the pipe lining machine 10 and comprises a first or centering trowel designated generally by the numeral 15 and a second or finishing trowel designated generally 16.

The particular trowels utilized in the form of the invention illustrated herein are formed in the shape of frusto-conical elements having the small ends thereof terminating in mounting members 17 and the larger ends thereof terminating in resilient, annular, expansible and contractable mortar engaging portions 18. The mounting member 17 at the small end of each trowel comprises a polygonal disk, the diameter of which is substantially less than the interior diameter of pipe 11. Individual overlapping trailing trowel plate 19 are provided and one end of each is fixed to the exterior of each side of the polygonal disk 17. The number of plates corresponds to the number of sides of the polygon.

The manner in which the trowel plates 19 overlap at the large end of the trowel whereby separation of the overlapping portions is prevented while permitting free resilient expansible and contractable movements thereof will now be described. At each overlap screw 20 has one end welded to the interior surface of an outer overlapping portion 21 of each trowel plate 19, as best seen in FIG. 3. The shank portion of the screw 20 extends radially inwardly through a circumferentially extending slot in an underlying portion 23 of an adjacent trowel plate trowel 19 whereby the overlapping portions 21 and 23 may slide against each other in a circumferential direction.

A bracket 24 is welded to the interior surface of the inner trowel plate 19 and has a slot which is co-extensive with the slot in trowel plate portion 23. Bracket 24 has a flange 25 at one end thereof which connects with one end of extension spring 26. The opposite end of spring 26 connects with the outer overlapping trowel plate portion 21 by connection with a washer 27 on screw 20. Washer 27 is spring biased toward outer trowel plate portion 21, thereby maintaining trowel plate portions 21 and 23 in closely engaged intersliding relationship, thus deterring mortar from seeping between the plates.

In the present embodiment rod 28 connects intermediate trowel 15 to the pipe lining machine 10 and also connects the intermediate trowel 15 to the finishing trowel 16. The connection between the pipe lining machine 10 and the rod 28 comprises a tubular extension 30 rigidly secured to the end of rod 28 at one end thereof and having a hollow cylindrical interior terminating at the opposite end thereof in an internal annular seat 31 with a reduced diameter opening. A key slot 32 is formed in one side of the tubular extension 30 to receive the end of rod 29 connected to pipe lining machine 10 and a ball 33 fixed to the end of rod 29. Ball 33 and rod 29 are inserted laterally into key slot 32 and moved to the right as shown in FIG. 1 to cause ball 33 to engage annular seat 31 to provide a pivotal connection.

The mounting member 17 of the finishing trowel 16 has fixed thereto a tubular extension 34 of the same general type as tubular extension 30 having a hollow interior terminating at one end in an annular seat 35 with a reduced diameter opening. The opposite end of tubular extension 35 has a flange 36 having screws passing therethrough into mounting member 17 for rigid connection therewith. Tubular extension 34, similar to tubular extension 30, has a key slot 37 in one side thereof. Rod 28 terminates at its trailing end in a ball 38 which, along with the adjacent portion of rod 28, is inserted laterally into key slot 37 and moved to the right as seen in FIG. 1 whereby the ball 38 engages the seat 35 thus pivotally connecting between trowel 16 to the trailing end of rod 28.

Intermediate its ends rod 28 is rigidly connected to the mounting member 17 of centering trowel 15. A bearing 39 is fixed to the mounting member 17 of centering trowel 15 by suitable means, such as the screws shown in FIG. 2. Rod 28 is rigidly secured to bearing 39 by set screws or the like, not shown.

It is an important feature of this invention that the mounting member 17 of centering trowel 15 is rigidly secured to rod 28 at such distance from the ball 38 that a diametral plane formed by the large end of the frusto-conical centering trowel 15 passes through or in the general location of ball 38. The large end of centering trowel 15 is constrained from any substantial lateral movement within pipe 11 by the annular mortar engaging surface portion 18.

It is apparent that any lateral movement of extension 30 due to divergence in the line of travel of machine 10 will cause the axis of rod 28 and trowel 15 to diverge from the longitudinal axis of the pipe 11 but, due to the restraint imposed by annular surface engaging portion 18 of trowel 15 and the rigid connection between rod 28 and centering trowel 15, the ball 38 will be maintained in the longitudinal axis of the pipe 11 notwithstanding such divergence of rod 28. By centering the ball 38 in the longitudinal axis of the pipe at all times irrespective to the movements of the machine 10, and by pivotally connecting the finishing trowel 16 to the ball at that point, it is apparent that frusto-conical finishing trowel 16 will be drawn centrally along the longitudinal axis of the pipe with the larger diameter end thereof maintained in a constant circumferential troweling angle of attack with respect to the interior surface of pipe 11 at all points around the periphery.

The present invention provides a centering rod having a pivotal connection with a pipe lining machine at one end thereof and a pivotal connection with a finishing trowel at the other end thereof with an intermediate rigid connection securing a centering trowel. It is apparent that the axis of the frusto-conical trowel 15 will always coincide with the axis of centering rod 28 no matter how centering rod 28 is angularly oriented within the pipe 11, due to the rigid connection therebetween. Where the pipe lining machine 10 wanders within the pipe or becomes canted to the longitudinal axis of the pipe thereby misaligning the connection between the machine 10 and the rod 28 from the longitudinal axis of the pipe, the rod 28 will, in turn, diverge from the axis of the pipe 11 but will at all such divergences maintain ball 38 so that the longitudinal axis of the pipe will pass therethrough. Finishing trowel 16 will therefore always be centered with respect to the longitudinal axis of the pipe and will at all times trowel the coated inner surface of the pipe 11 at a circumferentially uniform angle of attack as the trowel is drawn through the pipe throughout the pipe lining operation.

As a matter of convenience, economy of design and construction, and best operating conditions, rod 28 extends rigidly from the pivotal connections at opposite ends thereof to the machine 10 and finishing trowel 16. However, the important requirement is that rod 28 extend fixedly from the small end of intermediate trowel 15 to the pivotal connection with finishing trowel 16 so as to remain at all times axial with respect to trowel 15. Accordingly, any other desired means may be provided for connecting between the lining machine 10 and the small end of intermediate trowel 15 without departing from the present invention.

What is claimed is:

1. Trowel means adapted to be drawn through a pipe for smoothing a layer of lining material on an interior generally cylindrical surface thereof, said trowel means comprising a rod pivotally connected to traction means at the front end thereof, a frusto conically shaped centering trowel rigidly secured to said rod intermediate the ends thereof, said centering trowel having an expansible larger diameter end, the exterior of which engages said interior cylindrical surface, a finishing trowel pivotally connected to said rod at the rear end thereof, said latter connection lying approximately in a plan formed by the engaged exterior of said centering trowel for uniform circumferential angular application of said finishing trowel to said interior cylindrical surface throughout the length of said cylindrical surface as the trowel means is drawn therethrough.

2. Trowel means adapted to be drawn through a pipe for smoothing a layer of lining material on an interior generally cylindrical surface thereof, said trowel means comprising a rod pivotally connected to traction means at the front end thereof, a centering trowel rigidly secured to said rod intermediate the ends thereof, and a frusto conically shaped finishing trowel having an expansible larger diameter end the exterior of which engages said interior cylindrical surface, said finishing trowel being pivotally connected at the rear end of said rod whereby said finishing trowel is maintained in a substantially coaxial position with respect to said pipe as it moves therethrough.

3. Trowel means adapted to be drawn through a pipe for smoothing a layer of lining material on an interior generally cylindrical surface thereof, said trowel means comprising a rod pivotally connected to traction means at the front end thereof, a frusto conically shaped centering trowel rigidly secured to said rod intermediate the ends thereof, said centering trowel having an expansible larger diameter end the exterior of which engages said interior surface of said cylindrical surface, and a frusto conically shaped finishing trowel having an expansible larger diameter end the exterior of which engages said interior cylindrical surface, said finishing trowel being pivotally connected to the rear end of said rod, said latter connection lying generally in the center of a plane formed by the engaged exterior of said centering trowel for uniform circumferential angular application of said finishing trowel to said interior cylindrical surface throughout the length of said surface as the trowel means is drawn therethrough.

4. Trowel means adapted to be drawn by a pipe lining machine for smoothing a layer of lining material at an interior generally cylindrical surface, said trowel means comprising a centering trowel and a finishing trowel, each of said trowels having a frusto-conical trowel body extending between a large diameter end having exterior lining material engaging portions and an opposed smaller end having a rigid body member, a centering rod pivotally attached to said machine and to the smaller end of said finishing trowel at opposite ends thereof, said centering rod being rigidly connected intermediate said ends to the small end of said centering trowel and passing substantially axially therethrough.

5. Trowel means adapted to be drawn through a pipe for smoothing a layer of lining material on an interior cylindrical surface thereof comprising a frusto-conical centering trowel, a rod rigidly secured to said centering trowel at the smaller front end thereof and extending coaxially toward its large end, a frusto-conical finishing trowel having its smaller front end pivotally connected to the rear end of said rod at a point spaced rearwardly of said smaller front end of said centering trowel whereby said finishing trowel is maintained in substantially coaxial position with respect to said pipe as it moves therethrough.

6. Trowel means according to claim 5 wherein said centering trowel has an exterior periphery which engages the surface of the lining material and wherein said pivotal connection lies substantially in the center of a plane formed by the lining-engaging exterior periphery of said centering trowel.

References Cited

UNITED STATES PATENTS

| | | | |
|---|---|---|---|
| 1,612,842 | 1/1947 | Thompson et al. | 15/104.18 |
| 1,951,221 | 3/1934 | Tate | 25—38 |
| 2,369,719 | 2/1945 | Crane | 25—38 |
| 2,377,615 | 6/1945 | Crane | 25—38 X |
| 2,711,000 | 6/1955 | Matheny | 25—38 |
| 2,819,508 | 1/1958 | Martin | 25—38 |
| 3,257,697 | 6/1966 | Ruegsegger | 25—38 |
| 597,421 | 1/1898 | Krueger | 15—104.18 |
| 1,531,439 | 3/1925 | Haydock et al. | 15—104.18 |
| 1,593,072 | 7/1926 | Haydock et al. | 15—104.18 |

WILLIAM J. STEPHENSON, *Primary Examiner.*